(12) United States Patent
Ishii (10) Patent No.: US 12,084,157 B2
(45) Date of Patent: Sep. 10, 2024

(54) TRACKING SYSTEM AND TRACKING METHOD FOR WATER-SURFACE OBJECTS, AND MARINE VESSEL INCLUDING TRACKING SYSTEM FOR WATER-SURFACE OBJECTS

(71) Applicant: YAMAHA HATSUDOKI KABUSHIKI KAISHA, Iwata (JP)

(72) Inventor: Takahiro Ishii, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 438 days.

(21) Appl. No.: 17/471,223

(22) Filed: Sep. 10, 2021

(65) Prior Publication Data

US 2022/0126959 A1 Apr. 28, 2022

(30) Foreign Application Priority Data

Oct. 22, 2020 (JP) .................................. 2020-177228

(51) Int. Cl.
 *B63B 79/40* (2020.01)
 *B63B 79/10* (2020.01)
 (Continued)

(52) U.S. Cl.
 CPC .............. *B63B 79/40* (2020.01); *B63B 79/10* (2020.01); *G01C 21/203* (2013.01); *G06T 7/246* (2017.01);
 (Continued)

(58) Field of Classification Search
 CPC ........ B63B 79/40; B63B 79/10; G01C 21/203; G06T 7/246; G06T 7/285; G06T 7/292;
 (Continued)

(56) References Cited

U.S. PATENT DOCUMENTS

2021/0409655 A1* 12/2021 Kerst ...................... G06T 7/292
2022/0092291 A1* 3/2022 Lai ........................ G06V 20/70
(Continued)

FOREIGN PATENT DOCUMENTS

JP     09-295600 A    11/1997
JP     2013-020543 A   1/2013
(Continued)

OTHER PUBLICATIONS

Muhovic et al., "Obstacle Tracking for Unmanned Surface Vessels Using 3-D Point Cloud", Jul. 2020, IEEE Journal of Oceanic Engineering, vol. 45, No. 3 (Year: 2020).*
(Continued)

*Primary Examiner* — Chan S Park
*Assistant Examiner* — Daniel C Chang
(74) *Attorney, Agent, or Firm* — Keating & Bennett, LLP (57) ABSTRACT

A tracking system for tracking water-surface objects includes a stereo camera on a hull, at least one memory, and at least one processor coupled to the at least one memory. The at least one processor is configured or programmed to detect at least one object based on a first image and a second image captured by a first imaging unit and a second imaging unit of the stereo camera, and set one detected object as a tracking target in a third image captured by the first imaging unit, the second imaging unit or another imaging unit. The
(Continued)

at least one processor is further configured or programmed to track the tracking target using a temporal change in a feature of the tracking target, and use at least one object detected based on the first image and the second image during tracking to correct the tracking result.

12 Claims, 8 Drawing Sheets

(51) Int. Cl.
  *G01C 21/20* (2006.01)
  *G06T 7/246* (2017.01)
  *G06T 7/285* (2017.01)
  *G06T 7/292* (2017.01)
  *G06T 7/593* (2017.01)
  *G06T 7/73* (2017.01)
  *H04N 23/695* (2023.01)

(52) U.S. Cl.
  CPC .............. *G06T 7/285* (2017.01); *G06T 7/292* (2017.01); *G06T 7/596* (2017.01); *G06T 7/73* (2017.01); *H04N 23/695* (2023.01); *G06T 2207/10021* (2013.01)

(58) Field of Classification Search
  CPC . G06T 7/596; G06T 7/73; G06T 2207/10021; G06T 2207/10012; G06T 2207/30261; H04N 23/695
  See application file for complete search history.

(56) References Cited

U.S. PATENT DOCUMENTS

2023/0023434 A1* 1/2023 Nowicka ................ G06V 20/00
2023/0360230 A1* 11/2023 Qian ....................... G01S 11/12

FOREIGN PATENT DOCUMENTS

JP          2014-081871 A    5/2014
JP           5947938 B1      7/2016

OTHER PUBLICATIONS

Official Communication issued in corresponding European Patent Application No. 21202145.5, mailed on Mar. 23, 2022.
Muhovic et al., "Obstacle Tracking for Unmanned Surface Vessels Using 3-D Point Cloud", IEEE Journal of Oceanic Engineering, vol. 45, No. 3, Jul. 2020, pp. 786-798.
Henriques et al., "High-Speed Tracking with Kernelized Correlation Filters", IEEE Transactions on Pattern Analysis and Machine Intelligence, vol. 37, No. 3, Mar. 1, 2015, pp. 1-14.

* cited by examiner

TRACKING SYSTEM AND TRACKING METHOD FOR WATER-SURFACE OBJECTS, AND MARINE VESSEL INCLUDING TRACKING SYSTEM FOR WATER-SURFACE OBJECTS

CROSS REFERENCE TO RELATED APPLICATIONS

This application claims the benefit of priority to Japanese Patent Application No. 2020-177228 filed on Oct. 22, 2020. The entire contents of this application are hereby incorporated herein by reference.

BACKGROUND OF THE INVENTION

1. Field of the Invention

The present invention relates to a tracking system and a method for tracking water-surface objects, and marine vessels each including the tracking system for tracking water-surface objects.

2. Description of the Related Art

As disclosed in Japanese Laid-open Patent Publication (Kokai) No. H09-295600, there is known an automatic maneuvering device that controls a marine vessel so as to keep a constant distance between an object and the marine vessel. In the technique disclosed in Japanese Laid-open Patent Publication (Kokai) No. H09-295600, two image sensors capture images of a buoy as an object, a relative distance to the buoy is calculated by performing image processing on the captured images, and the marine vessel is then controlled so as to keep the relative distance. Also in the field of automobiles, a technique of detecting a distance and an azimuth of a preceding vehicle using a stereo camera is utilized for the purpose of automatic tracking.

However, when the appearance of an object to be tracked largely changes due to a change in its course direction, its speed, or other factors, it becomes hard to track the object in some cases. In particular, in the field of marine vessels, it is not easy to predict the movement or posture change of marine vessels, unlike vehicles traveling on roads. This may result in low tracking accuracy of objects like marine vessels.

SUMMARY OF THE INVENTION

Preferred embodiments of the present invention provide tracking systems and tracking methods for tracking water-surface objects, and marine vessels each including a tracking system for tracking water-surface objects that are able to improve tracking accuracy of water-surface objects.

According to a preferred embodiment of the present invention, a tracking system for tracking water-surface objects includes a stereo camera, at least one memory, and at least one processor coupled to the at least one memory. The stereo camera includes a first imaging unit and a second imaging unit, and is disposed on a hull. The at least one processor is configured or programmed to acquire a first image captured by either one of the first imaging unit or the second imaging unit; acquire a second image captured by the other one of the first imaging unit or the second imaging unit; and acquire a third image captured by any one of the first imaging unit, the second imaging unit, or another imaging unit disposed on the hull. The at least one processor is further configured or programmed to detect at least one object based on the first image and the second image; set one of the detected at least one object as a tracking target in the third image; track the tracking target by using a temporal change in a feature of the tracking target in the third image; and use at least one object detected based on the first image and the second image in a process of tracking the tracking target to correct a tracking result of the tracking target.

According to another preferred embodiment of the present invention, a tracking method for tracking water-surface objects for use in a marine vessel is provided. The marine vessel includes a stereo camera including a first imaging unit and a second imaging unit, wherein the stereo camera is disposed on a hull. The tracking method includes acquiring a first image captured by either one of the first imaging unit or the second imaging unit; acquiring a second image captured by the other one of the first imaging unit or the second imaging unit; and acquiring a third image captured by any one of the first imaging unit, the second imaging unit, or another imaging unit disposed on the hull. The tracking method further includes detecting at least one object based on the first image and the second image; setting one of the detected at least one object as a tracking target in the third image; tracking the tracking target by using a temporal change in a feature of the tracking target in the third image; and using at least one object detected based on the first image and the second image in a process of tracking the tracking target to correct a tracking result of the tracking target.

According to another preferred embodiment of the present invention, a marine vessel includes a hull and the above-described tracking system for tracking water-surface objects.

According to preferred embodiments of the present invention, a first image captured by either one of the first imaging unit or the second imaging unit is acquired, a second image captured by the other one of the first imaging unit or the second imaging unit is acquired, and a third image captured by any one of the first imaging unit, the second imaging unit, or another imaging unit disposed on the hull is acquired. Based on the first image and the second image, at least one object is detected. One of the detected at least one object is set as a tracking target in the third image, and the tracking target is tracked by using a temporal change in a feature of the tracking target in the third image. A tracking result of the tracking target is corrected by using at least one object detected based on the first image and the second image in a process of tracking the tracking target. As a result, the tracking accuracy of water-surface objects is improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
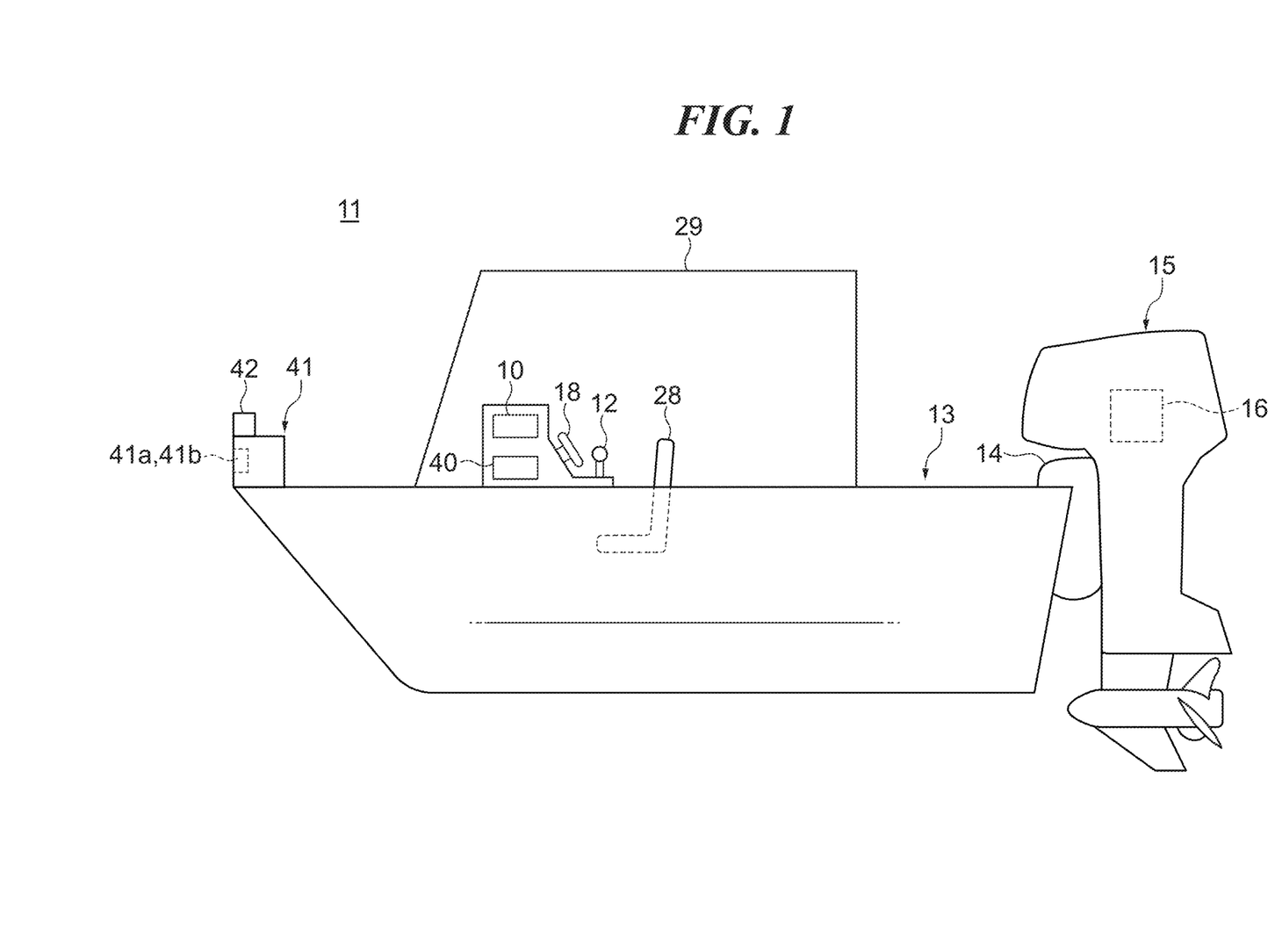
FIG. 1 is a schematic side view of a marine vessel to which a tracking system for tracking water-surface objects is provided.

FIG. 1 is a schematic side view of a marine vessel to which a tracking system for tracking water-surface objects according to a preferred embodiment of the present invention is provided. A marine vessel 11 includes a hull 13 and an outboard motor 15 which defines and functions as a marine propulsion device mounted on the hull 13. The number of the outboard motors 15 provided on the hull 13 is not limited. The hull 11 is provided with a cabin 29, in which a central unit 10, a subunit 40, a steering wheel 18, and a throttle lever 12 are provided near a maneuvering seat 28.

In the following description, front, rear, left, right, up, and down directions respectively refer to front, rear, left, right, up, and down directions of the hull 13. The right-and-left direction is defined with reference to the view of the hull 13 from the rear. The vertical direction is perpendicular to the front-and-rear direction and the left-and-right direction.

The outboard motor 15 is mounted on the hull 13 via a mounting unit 14. The outboard motor 15 includes an engine 16 which defines and functions as an internal combustion engine. The outboard motor 15 generates a thrust force to move the hull 13 by a propeller being rotated by a driving force of the engine 16. The mounting unit 14 includes a swivel bracket, a clamp bracket, a steering shaft, and a tilt shaft (none of which are illustrated). The mounting unit 14 further includes a power trim and tilt mechanism (PTT mechanism) 27 (refer to FIG. 2). The PTT mechanism 27 turns the outboard motor 15 about a tilt axis. This makes it possible to change inclination angles (trim angle and tilt angle) of the outboard motor 15 with respect to the hull 13, and thus the trim is adjusted and the outboard motor 15 is tilted up and down. The outboard motor 15 is able to turn about the steering shaft with respect to the swivel bracket. Operating the steering wheel 18 causes the outboard motor 15 to turn in the right-and-left direction, thus maneuvering the marine vessel 11.

A stereo camera 41 and a third camera 42 (which is also referred to as a camera 42 in FIG. 2) are installed in a front portion of the hull 13. Each camera may be attached, for example, to a bow rail (which is not illustrated) directly or via a support member. The stereo camera 41 includes a first camera 41a (a first imaging unit) and a second camera 41b (a second imaging unit), which define a pair of imaging units. Imaging directions of the first camera 41a, the second camera 41b, and the third camera 42 are all set frontward or substantially frontward.

Figure 2:
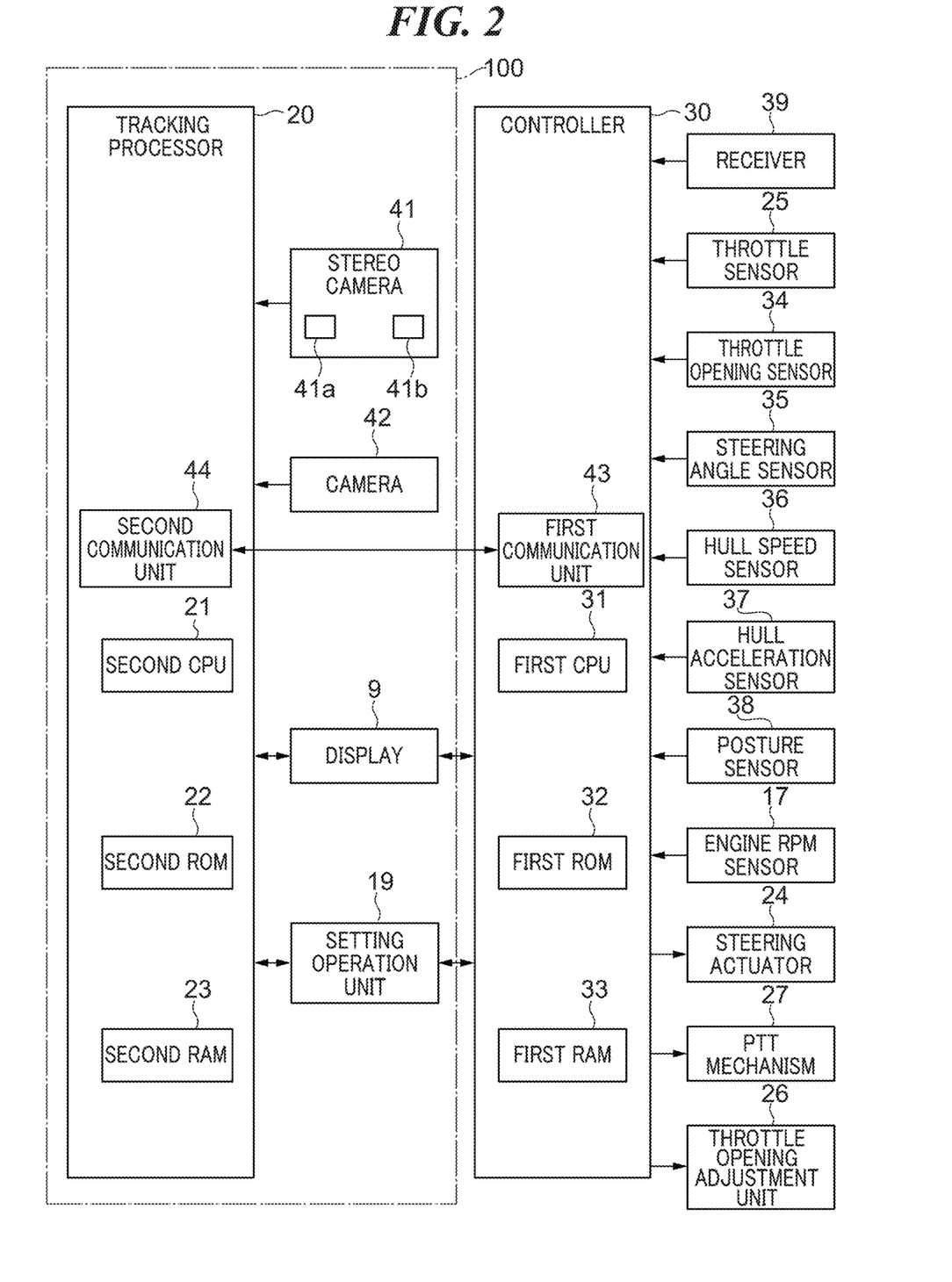
FIG. 2 is a block diagram of a maneuvering system.

FIG. 2 is a block diagram of a maneuvering system. The maneuvering system includes a tracking system 100 for tracking water-surface objects. The tracking system 100 for tracking water-surface objects includes a tracking processor 20, the stereo camera 41, the third camera 42, a display 9, and a setting operation unit 19. The third camera 42 is not necessarily essential. Note that the entire maneuvering system may be referred to as the tracking system 100 for tracking water-surface objects.

The marine vessel 11 includes a controller 30, a throttle sensor 25, a throttle opening sensor 34, a steering angle sensor 35, a hull speed sensor 36, a hull acceleration sensor 37, a posture sensor 38, an engine rpm sensor 17, a receiver 39, the display 9, the setting operation unit 19, a steering actuator 24, the PTT mechanism 27, and a throttle opening adjustment unit 26, as components mainly related to maneuvering.

The controller 30, the throttle sensor 25, the steering angle sensor 35, the hull speed sensor 36, the hull acceleration sensor 37, the posture sensor 38, the throttle opening adjustment unit 26, the receiver 39, the display 9, and the setting operation unit 19 are included in the central unit 10, or are located in the vicinity of the central unit 10. The display 9 and the setting operation unit 19 may be included in the subunit 40 instead of the central unit 10. Alternatively, each of the central unit 10 and the subunit 40 may individually include the display 9 and the setting operation unit 19. The steering actuator 24 and the PTT mechanism 27 are provided for the outboard motor 15. The throttle opening sensor 34 and the engine rpm sensor 17 are provided in the outboard motor 15.

The controller 30 includes a first communication unit 43, a first CPU 31, a first ROM 32, a first RAM 33, and a timer which is not illustrated. The first ROM 32 stores control programs. The first CPU 31 loads the control programs stored in the first ROM 32 into the first RAM 33 and executes the control programs to implement various types of control processes. The first RAM 33 provides a work area for the first CPU 31 to execute the control programs. The first communication unit 43 communicates with the tracking processor 20 in a wired or wireless manner.

Detection results by the sensors 17, 25, and 34 to 38 are supplied to the controller 30. The throttle lever 12 (FIG. 1) is a throttle operator that a vessel operator uses to manually adjust a throttle opening degree. The throttle sensor 25 detects an operation position of the throttle lever 12. The throttle opening sensor 34 detects an opening degree of a throttle valve which is not illustrated. The throttle opening adjustment unit 26 adjusts the opening degree of the throttle valve. During normal control, the first CPU 31 controls the throttle opening adjustment unit 26 according to the operation position of the throttle lever 12. The steering angle sensor 35 detects the turning angle of the turned steering wheel 18. The hull speed sensor 36 and the hull acceleration sensor 37 respectively detect the speed and acceleration of navigation of the marine vessel 11 (the hull 13).

The posture sensor 38 includes, for example, a gyro sensor and a magnetic azimuth sensor. Using signals output from the posture sensor 38, the controller 30 calculates a roll angle, a pitch angle, and a yaw angle of the hull 13. The controller 30 may calculate the roll angle and the pitch angle using output signals from the hull acceleration sensor 37. The receiver 39 includes a GNSS (Global Navigation Satellite Systems) receiver module like a GPS, and has a function of receiving GPS signals or various types of signals as positional information. Signals received by the receiver 39 are supplied to the first CPU 31.

The engine rpm sensor 17 detects the number of rotations per unit time of the engine 16. The display 9 displays various types of information. The setting operation unit 19 includes an operator that a vessel operator uses to perform operations relating to maneuvering, a PTT operation switch, a setting operator that a vessel operator uses to make various settings, and an input operator that a vessel operator uses to input various types of instructions (none of which is illustrated).

The steering actuator 24 turns the outboard motor 15 in the left-and-right direction with respect to the hull 13. Turning the outboard motor 15 changes a direction in which a propulsive force acts on the hull 13. The PTT mechanism 27 tilts the outboard motor 15 with respect to the clamp bracket by turning the outboard motor 15 about the tilt shaft. The PTT mechanism 27 is activated in response to, for example, operation of the PTT operation switch. As a result, the PTT mechanism 27 changes the inclination angle of the outboard motor 15 with respect to the hull 13.

Note that the controller 30 may acquire the detection result given by the engine rpm sensor 17 via a remote control ECU which is not illustrated. Note that the controller 30 may control the engine 16 via an outboard motor ECU (which is not illustrated) provided in the outboard motor 15.

The tracking processor 20 is included in the subunit 40. The tracking processor 20 includes a second communication unit 44, a second CPU 21, a second ROM 22, a second RAM 23, and a timer which is not illustrated. The subunit 40 and the controller 30 are communicably connected to each other via the second communication unit 44 and the first communication unit 43. The type of communication protocol between the subunit 40 and the controller 30 is not limited, but for example, a control area network (CAN) protocol is used. The first CPU 31 communicates with the second CPU 21 to exchange information. The second ROM 22 stores control programs. The second CPU 21 loads the control programs stored in the second ROM 22 into the second RAM 23 and executes the control programs to implement various types of control processes. The second RAM 23 provides a work area for the second CPU 21 to execute the control programs. The display 9 and the setting operation unit 19 are connected not only to the controller 30 but also to the tracking processor 20.

The stereo camera 41 is arranged on the hull 13 so that the first camera 41a and the second camera 41b are aligned in the substantially left-and-right direction with a space maintained between the first and second cameras 41a and 41b. The first camera 41a, the second camera 41b, and the third camera 42 are arranged so that their imaging areas substantially overlap each other. A view angle and an imaging direction of each of the cameras 41a, 41b, and 42 are set so that the water surface (sea surface) is included in all the imaging areas of the cameras during planing of the marine vessel 11. The images captured by the cameras 41a, 41b, and 42 are supplied to the second CPU 21. The images captured by the cameras 41a, 41b, and 42 are respectively referred to as a first image, a second image, and a third image.

Figure 3:
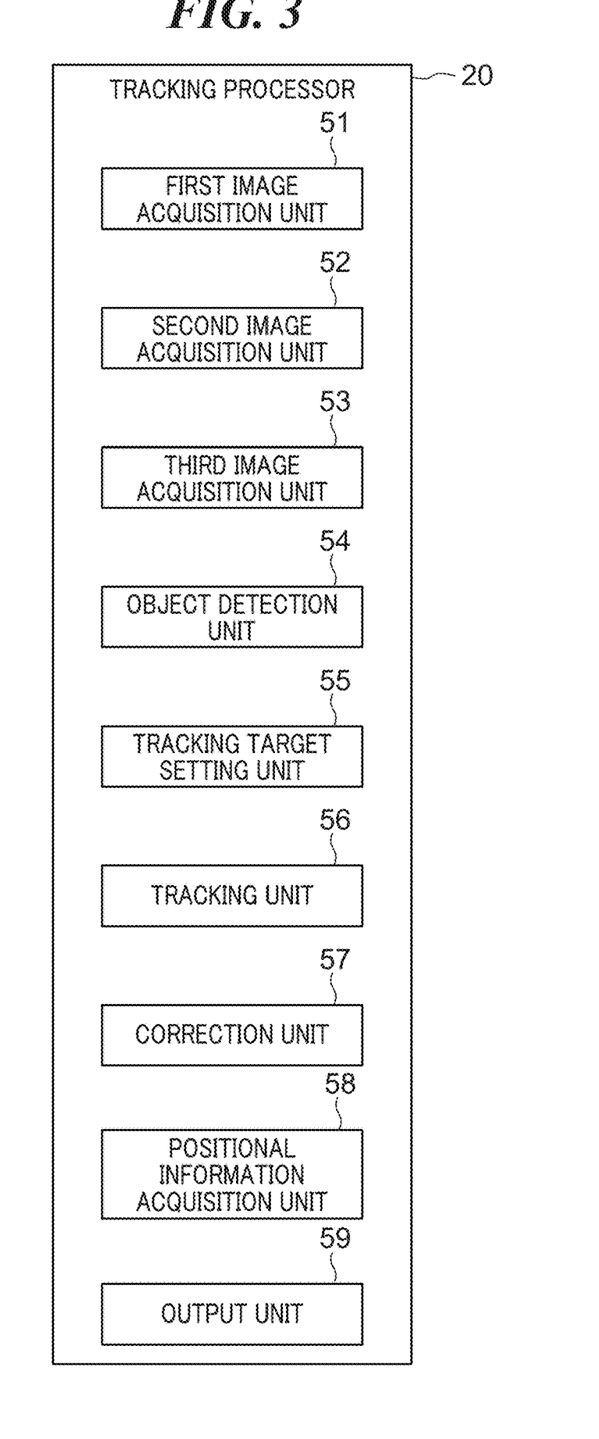
FIG. 3 is a functional block diagram of a tracking processor.

FIG. 3 is a functional block diagram of the tracking processor 20. The tracking processor 20 includes functional units which are a first image acquisition unit 51, a second image acquisition unit 52, a third image acquisition unit 53, an object detection unit 54, a tracking target setting unit 55, a tracking unit 56, a correction unit 57, a positional information acquisition unit 58, and an output unit 59. The functions of these units are mainly achieved by cooperation of the second CPU 21, the second ROM 22, the second RAM 23, the second communication unit 44, the timer which is not illustrated, and other components.

The first image acquisition unit 51 acquires a first image captured by the first camera 41a. The second image acquisition unit 52 acquires a second image captured by the second camera 41b. The third image acquisition unit 53 acquires a third image captured by the third camera 42. The object detection unit 54 detects at least one object based on the first image and second image that have been acquired.

The object detection unit 54 may carry out the object detection by using a known obstacle detection algorithm for detecting solid objects. For example, the object detection unit 54 creates a stereoscopic image with parallax information from the first image and the second image, and detects at least one object based on the stereoscopic image and a focal distance of the stereo camera 41. For example, in a case in which the height of a certain target material on the water surface exceeds the height of a horizontal plane at the same parallax as the certain target material, the presence of an object is recognized. The known obstacle detection algorithms are disclosed in, for example, Japanese Laid-open Patent Publication (Kokai) No. 2013-020543, Japanese Laid-open Patent Publication (Kokai) No. 2014-081871, and Japanese Patent No. 5947938, but the method to be used is not limited.

The tracking target setting unit 55 sets one of at least one object detected by the object detection unit 54 as a tracking target (which is also referred to as a target) in the third image. For example, the tracking target setting unit 55 causes the display 9 to display the third image together with a frame (a frame 2 which will be described below with reference to FIGS. 6 to 8) surrounding a detected object. Since one frame corresponds to one detected object, multiple frames may be displayed on the display 9 in some cases. When a user designates one desired frame through the setting operation unit 19, the tracking target setting unit 55 sets an object corresponding to the designated frame as a tracking target.

The tracking unit 56 tracks the tracking target by using a temporal change in a feature of the tracking target in the third image. The object tracking method used by the tracking unit 56 is not limited, but, for example, the Kernelized Correlation Filter (KCF) algorithm may be used for the tracking. The KCF offers a sequential-learning-based tracking method. Other tracking methods commonly used in the image recognition field, such as template matching, the Kanade-Lucas-Tomasi Feature Tracker (KLT), the Mean Shift method, a particle filter, may also be used for the tracking. The tracking unit 56 uses, as a feature of the tracking target, a feature corresponding to the tracking method to be actually used, wherein examples of the feature include color information like a color histogram in a predetermined area in the image, shape information like edges, and a SIFT feature.

Figure 6:
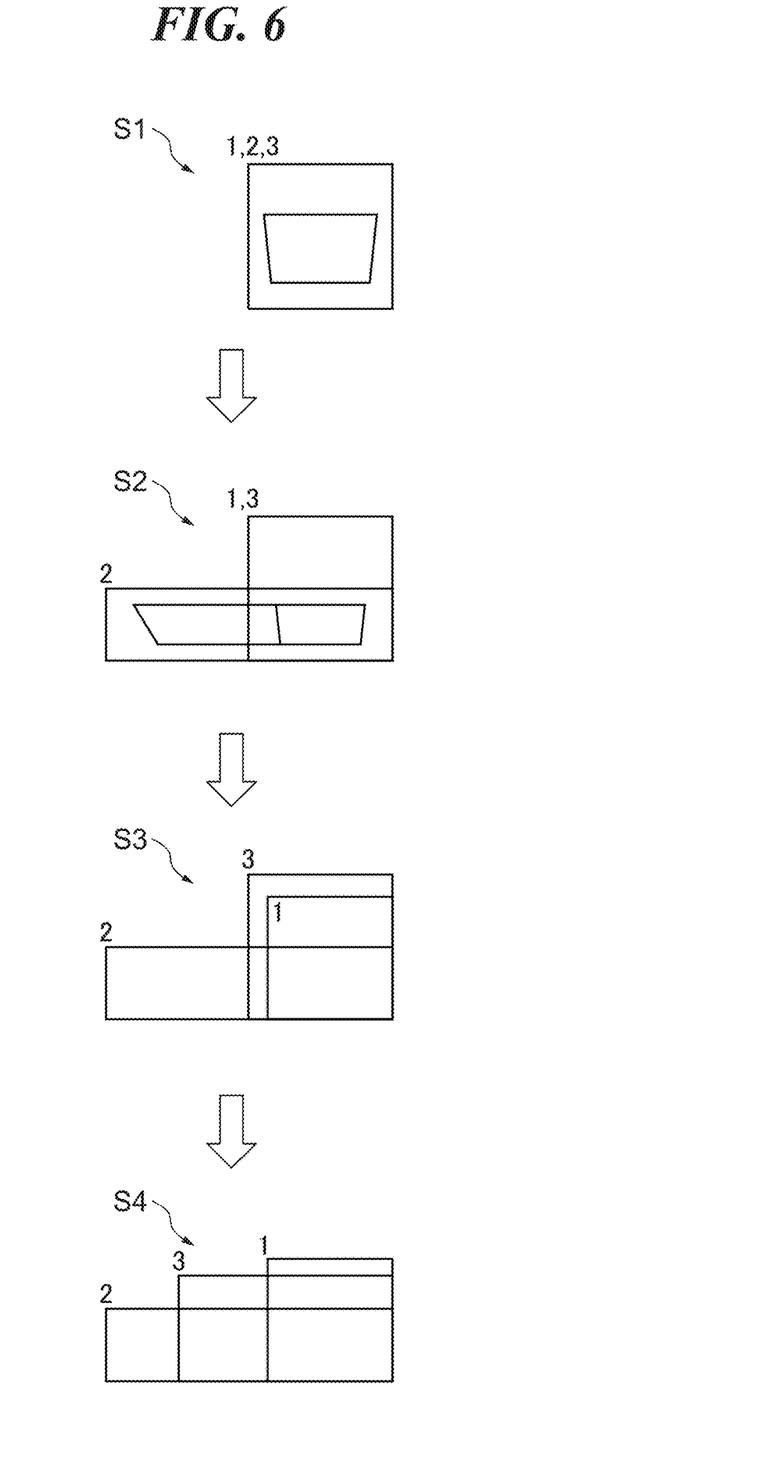
FIG. 6 is a schematic diagram illustrating changes in a screen display in the tracking process.
Figure 7:
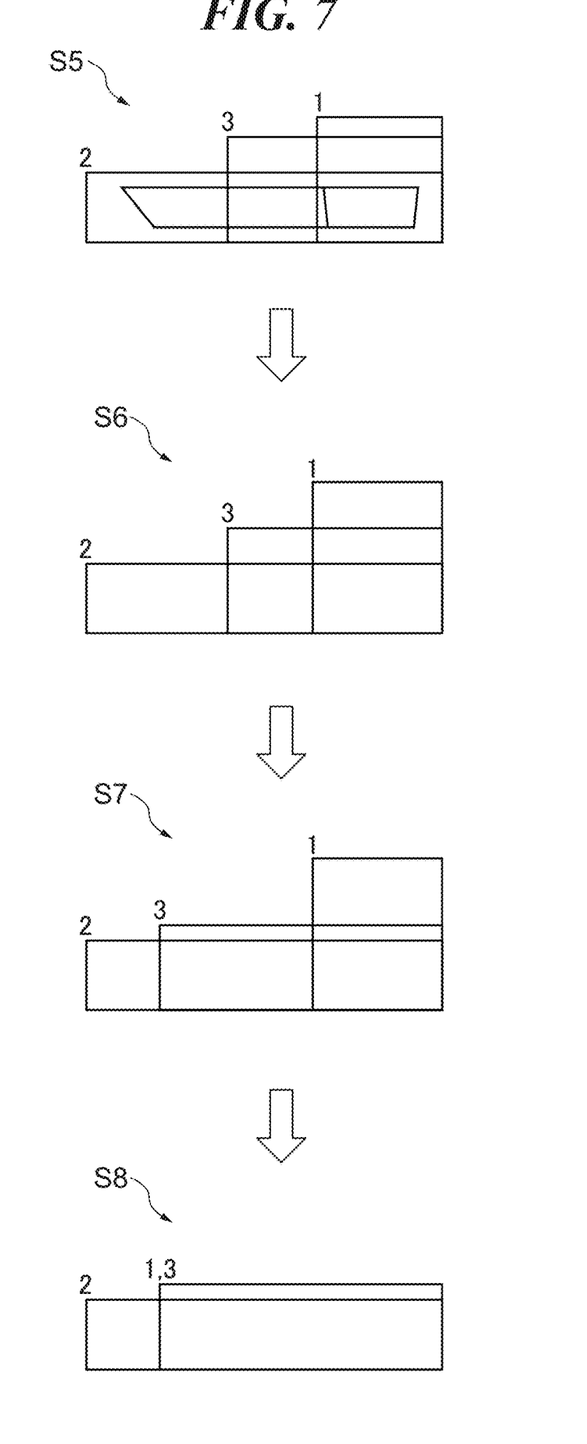
FIG. 7 is a schematic diagram illustrating changes in a screen display in the tracking process.
Figure 8:
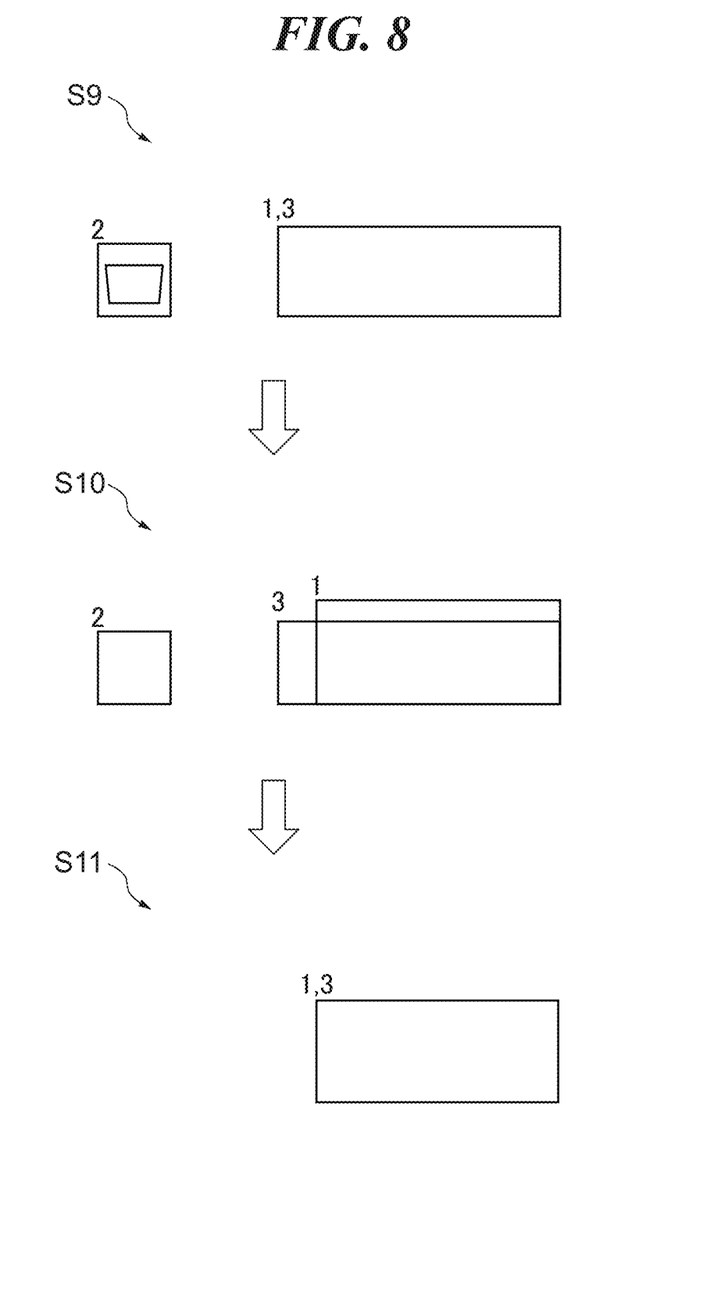
FIG. 8 is a schematic diagram illustrating changes in a screen display in the tracking process.

Also while the tracking unit 56 is tracking the tracking target, the object detection unit 54 detects objects based on the first images and the second images that are acquired sequentially. Using at least one object detected while the tracking unit 56 is tracking the tracking target, the correction unit 57 corrects a tracking result of the tracking target given by the tracking unit 56. Details of operations of the tracking unit 56 and the correction unit 57 will be described below using a tracking process (FIG. 5) and examples of the tracking process (FIGS. 6 to 8). Based on the tracking result, the positional information acquisition unit 58 acquires positional information of the tracking target by estimation (which will be described below in step S105). The output unit 59 outputs the positional information acquired by the positional information acquisition unit 58 to the controller 30 by communication. Note that as an example, the controller 30 defines and functions as a navigation controller that controls navigation of the hull 13 by using the positional information that has been output, and controls the marine vessel to follow the target by using the positional information that has been received, which is so-called automatic tracking.

Figure 4:
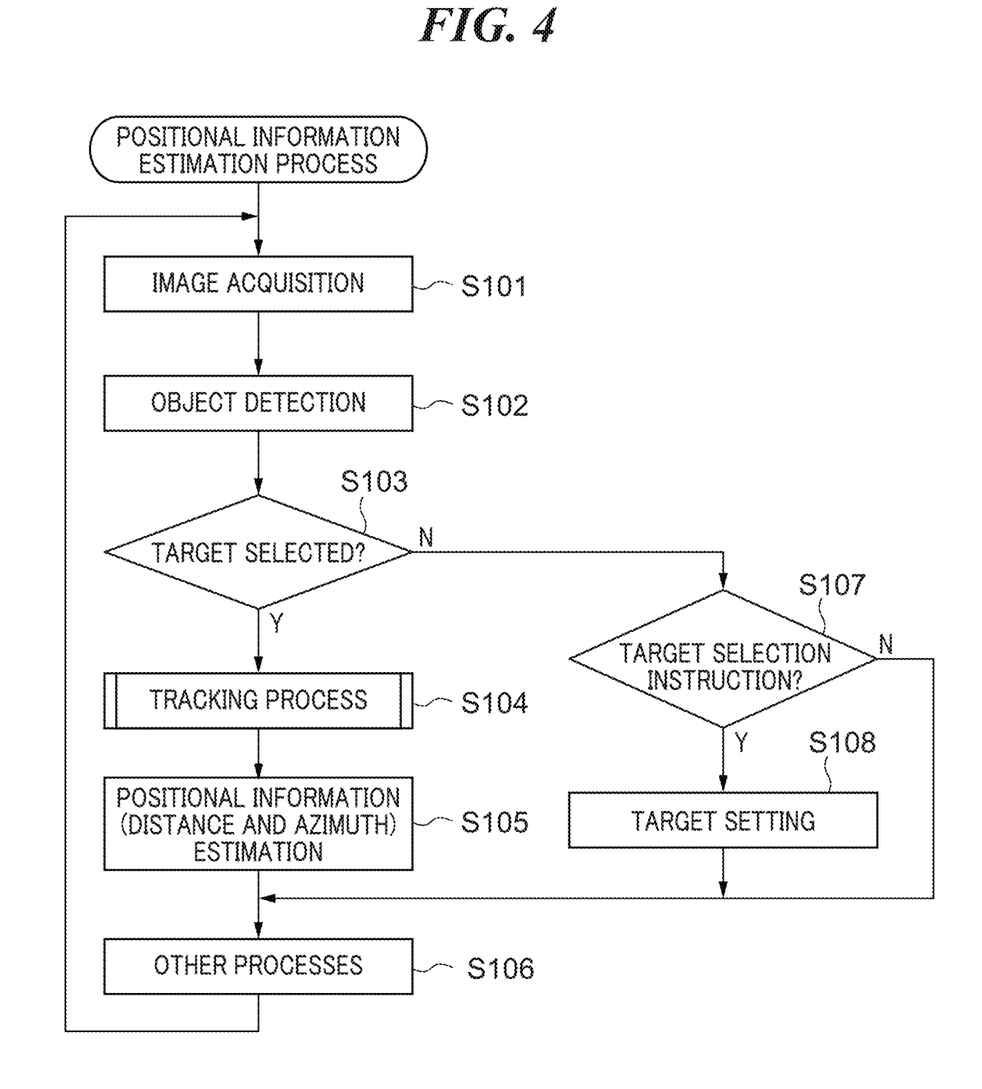
FIG. 4 is a flowchart illustrating a positional information estimation process.

FIG. 4 is a flowchart illustrating a positional information estimation process. This process is implemented by the second CPU 21 loading a program stored in the second ROM 22 into the second RAM 23 and executing the program. This process starts when the maneuvering system is activated.

In step S101, the second CPU 21 acquires the first image, the second image, and the third image respectively captured by the first camera 41a, the second camera 41b, and the third camera 42, as described above with respect to the image acquisition units 51, 52, and 53. The second CPU 21 acquires a sequence of each of the first to third images (image frames), for example, one (one frame) at a time. Therefore, processes of steps S101 to S106 are repeatedly executed for every image frame. In step S102, the second CPU 21 detects at least one object based on the first image and the second image by using the object detection algorithm, as described above with respect to the object detection unit 54.

In step S103, the second CPU 21 determines whether a tracking target or a target has already been selected. As a result of the determination, in a case in which the target has not been selected, the second CPU 21 determines in step S107 whether there is a target selection instruction. Here, a user is able to input an instruction to select the target through the setting operation unit 19 at any time. In a case in which the selection instruction has been input, the second CPU 21 determines that there is the target selection instruction.

As a result of the determination in step S107, in a case in which there is the target selection instruction, the second CPU 21 sets the target in step S108. That is, as described above with respect to the tracking target setting unit 55, when a user uses the setting operation unit 19, and designates one of the frames 2 displayed on the display 9 while being superimposed on the third image, the second CPU 21 sets the target according to the designation. After step S108, the second CPU 21 advances the process to step S106. As a result of the determination in step S107, in a case in which there is no target selection instruction, the second CPU 21 advances the process to step S106.

As a result of the determination in step S103, in a case in which the target has been selected, the second CPU 21 executes the tracking process, which will be described below (FIG. 5), in step S104. With such a tracking process, the position and the shape of the target (corresponding to a frame 1 which will be described below with reference to FIGS. 6 to 8) are determined for the current image frame.

Next, in step S105, the second CPU 21 estimates (acquires) the positional information of the target based on the frame 1 that has been determined in step S104. Such positional information includes a relative distance (m) of the target from the stereo camera 41 and an azimuth (angle) of the target with respect to the stereo camera 41. The second CPU 21 acquires the relative distance of the target from the stereo camera 41 based on an image portion corresponding to the target in the first image and an image portion corresponding to the target in the second image. That is, the second CPU 21 generates a distance image of a portion corresponding to the frame 1 from the first image and the second image. The second CPU 21 then estimates the relative distance of the target from the parallax of the distance image. The second CPU 21 further calculates the azimuth of the target based on the position in the left-and-right direction of the frame 1 (corresponding to the target) in the third image. Note that a method for estimating the relative distance or the azimuth is not limited.

After step S105, the second CPU 21 executes other processes in step S106, and returns to step S101. In the "other processes", the second CPU 21 executes, for example, various kinds of processes corresponding to settings or operations provided through the setting operation unit 19. When receiving an instruction to end the maneuvering system, the second CPU 21 ends the processes of the present flowchart. In a case in which a user desires to change the temporarily selected target afterward, the user is able to input a target selection instruction through the setting operation unit 19 in the "other processes". In this case, the second CPU 21 executes a process similar to that in step S108, and sets a new target according to the target selection instruction that has been input by the user. This enables a change of the target in midstream. The "other processes" may include a process that the output unit 59 transmits the positional information that has been estimated in step S105 to the controller 30.

Figure 5:
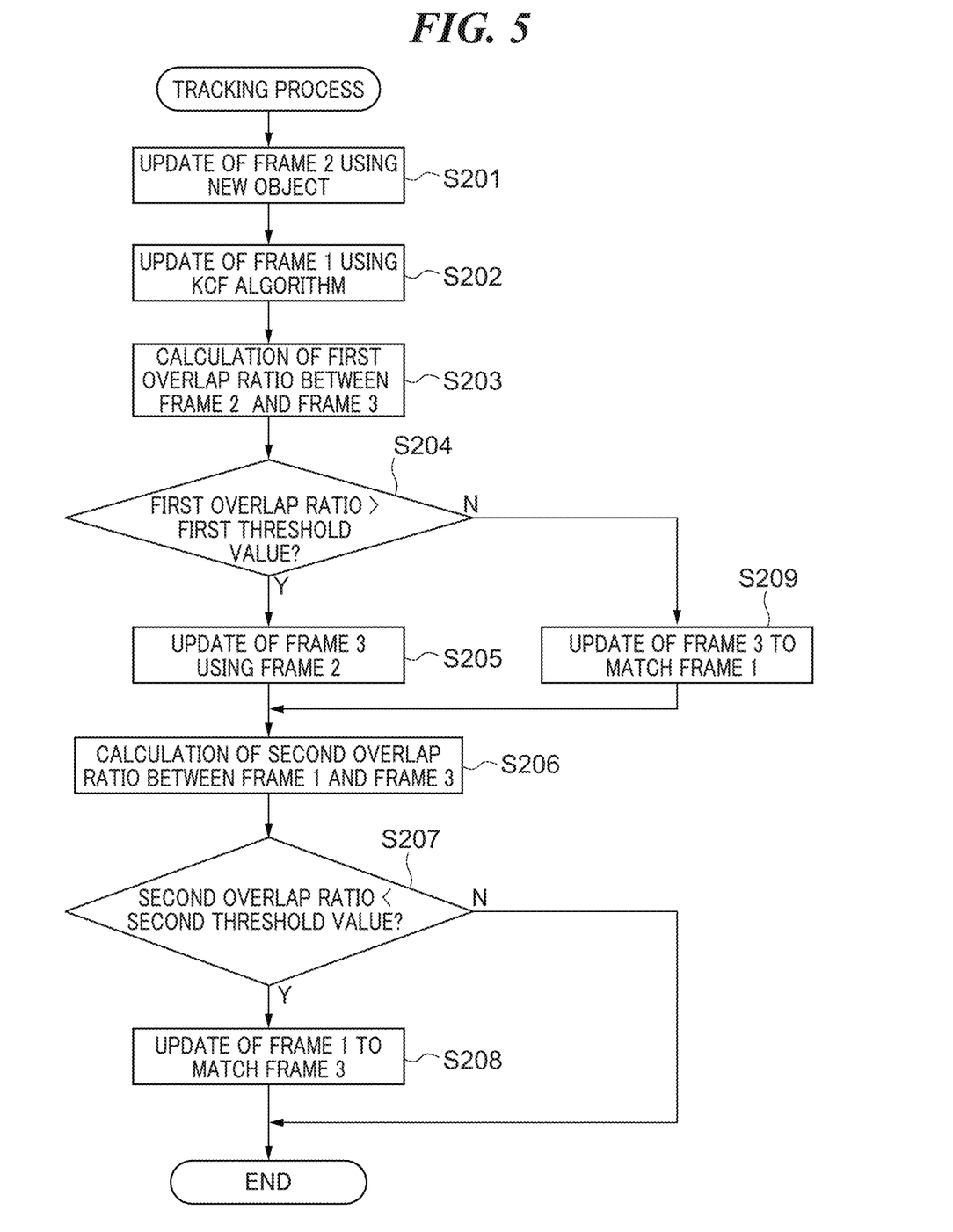
FIG. 5 is a flowchart illustrating a tracking process.

FIG. 5 is a flowchart illustrating the tracking process executed in step S104 of FIG. 4. Each of FIGS. 6, 7, and 8 is a schematic diagram illustrating changes in a screen display in the tracking process.

In the tracking process, the second CPU 21 tracks the target by using a temporal change in a feature of the target in the third image, and corrects a tracking result of the target using at least one object detected based on the first image and the second image in a process of tracking the tracking target. Specifically, the second CPU 21 sets a first frame and a second frame in the third image, in which the first frame indicates the position of the target as the tracking result, and the second frame indicates the position of one of at least one object that has been detected based on the first image and the second image. The second CPU 21 may further set a third frame in the third image based on the second frame. Furthermore, the second CPU 21 updates a position and a shape of the first frame based on the second frame, while tracking the target, so as to correct the tracking result. At this time, the second CPU 21 may update a position and a shape of the third frame based on the second frame, and may also update the position and the shape of the first frame based on the third frame, so as to correct the tracking result.

As illustrated in FIGS. 6 to 8, during the tracking process, the second CPU 21 causes the display 9 to display the third image together with frames 1, 2, and 3 (the first, second, and third frames) which are superimposed on the third image. In FIGS. 6 to 8, numerals 1, 2, and 3 beside the frames indicate the names of the frames 1, 2, and 3. The position and the shape of the frame 1 correspond to the tracking result of the target. The frame 2 is a frame surrounding an object detected in step S102. The frame 3 is a temporary frame used to correct the tracking result. Note that, for ease of understanding, changes and movements of the shapes of the frames 1, 2, and 3 are exaggerated. In many cases, an actual change in each of the frames 1 to 3 between image frames is smaller than that illustrated.

A description is provided of an outline of changes of the frames. After the target is set in step S108 in FIG. 4, initial values of the frames 1, 2, and 3 are set to a common value. The frame 1 is updated in steps S202 and S208 in FIG. 5. The frame 2 is updated in step S201 in FIG. 5. The frame 3 is updated in steps S205 and S209 in FIG. 5. The frame 3 is updated so as to smoothly follow the frame 2 (at a constant expansion and contraction ratio) in step S205. In a case in which a deviation of the frame 3 from the frame 1 becomes larger than a certain value, the frame 3 is updated so as to match the frame 1 in step S209. In FIGS. 6 to 8, a figure in the frame 2 in each of states S1, S5, and S9 indicates an object that has been detected. In the state S1, a preceding marine vessel is planing straight, and a rear portion of the marine vessel appears in the frame 2. In the state S2, the preceding marine vessel has changed its orientation to the left, and the port side and the rear portion appear in the frame 2.

A description is provided of the flowchart illustrated in FIG. 5 with reference to FIGS. 6 to 8. In step S201, the second CPU 21 updates the frame 2 using a new object that has been detected in the previous step S102. Since multiple objects are able to be detected in the step S102, the second CPU 21 thus is able to update multiple frames 2 including not only the frame corresponding to the target that has moved but also frames corresponding to objects other than the target.

In step S202, the second CPU 21 tracks the target by using an object tracking method such as the KCF algorithm, and updates the position and the shape of the frame 1 so as to reflect the tracking result. Note that the process of step S202 is achieved by the tracking unit 56 (FIG. 3). Further, processes of steps S203 to S209 are achieved by the correction unit 57 (FIG. 3).

In step S203, the second CPU 21 calculates a first overlap ratio between the frame 2 and the frame 3. When the region of the frame 2 is represented by A and the region of the frame 3 is represented by B, the first overlap ratio is calculated by, for example, the ratio of areas, (A∩B)/(A∪B). (A∩B) represents a common portion or an overlapping portion of the region A and the region B (which is also represented by "A and B"). (A∪B) is a union of the region A and the region B, which is also represented by "A or B". In a case in which there are multiple frames 2, the second CPU 21 calculates the first overlap ratios for respective frames 2. A method for calculating the overlap ratio is not limited to this example.

In step S204, the second CPU 21 determines whether the first overlap ratio is larger than a first threshold value. Note that in a case in which there are multiple frames 2, the largest one of the first overlap ratios is compared with the first threshold value. In a case in which the first overlap ratio is not larger than the first threshold value, the second CPU 21 determines that the frame 2 has been set for another object different from the target or an error has occurred. In this case, the second CPU 21 updates the frame 3 to match the frame 1 in step S209. Therefore, the frame 3 is not updated so as to follow the current frame 2.

On the other hand, in a case in which the first overlap ratio is larger than the first threshold value, the second CPU 21 determines that the frame 2 is set as the target. Therefore, in step S205, the second CPU 21 updates the frame 3 based on the frame 2. As an example, the second CPU 21 changes (in position, size, shape, and the like) the frame 3 closer to the frame 2 at a predetermined ratio. The predetermined ratio is set in advance to a value larger than 0% and equal to or smaller than 100%, for example, 50%. The predetermined ratio is not limited to this value, and may be changed by the user afterward.

For example, in the state S3 illustrated in FIG. 6, the first overlap ratio is larger than the first threshold value, and the state transitions to the state S4. That is, the second CPU 21 changes the size of the frame 3 to bring its vertical and horizontal sizes closer to those of the frame 2 by 50%. In FIGS. 6 to 8, in order to facilitate understanding, the frames are updated while the vertical positions of bottom sides of the frames are made common and fixed. Therefore, when the frame 3 is updated to follow the frame 2, the frame 3 is changed so that the vertical position of its bottom side is fixed, and its top side and one of its vertical sides are displaced to reduce their distances to the corresponding sides of the frame 2 by 50%. Note that the manner of updating the frame 2 is not limited to that. For example, the frame 3 may be updated so that the gravity center position of the frame 3 is changed to coincide with the gravity center position of the frame 2. As the predetermined ratio is lower, the degree of the frame 3 following the frame 2 becomes smoother.

After steps S205 and S209, the second CPU 21 calculates a second overlap ratio between the frame 1 and the frame 3 in step S206. The way to calculate the second overlap ratio is similar to the way to calculate the first overlap ratio. In step S207, the second CPU 21 determines whether the second overlap ratio is smaller than a second threshold value. As a result of the determination, in a case in which the second overlap ratio is not smaller than the second threshold value, it means that the degree of a deviation of the frame 1 with respect to the frame 3 is small, and thus, the second CPU 21 ends the processes illustrated in FIG. 5.

On the other hand, in a case in which the second overlap ratio is smaller than the second threshold value, it means that the degree of the deviation of the frame 1 with respect to the frame 3 becomes larger. Thus, the second CPU 21 updates the position and the shape of the frame 1 so as to match the frame 1 with the frame 3. For example, in the state S7 illustrated in FIG. 7, the frame 1 largely deviates from the frame 3 and the second overlap ratio becomes smaller than the second threshold value. Thus, the frame 1 is updated to match the frame 3, and the state transitions to a state S8. The reason why step S207 is provided is to avoid frequent updates of the frame 1. After step S208, the second CPU 21 ends the processes illustrated in FIG. 5.

In this manner, the frame 1, which is the tracking result that has been updated in step S202, is corrected in step S208. Accordingly, the tracking accuracy is improved.

A detailed description is provided of operation examples illustrated in FIGS. 6 to 8. It is assumed that the state S1 illustrated in FIG. 6 is the state of the frames at an end time point of an Nth loop in the flowchart illustrated in FIG. 4. At this time point, the frames 1, 2, and 3 match one another.

In the (N+1)th loop, in the state S2, the frame 2 is updated based on an object that has been detected in the previous step S102 (S201), and in the state S3, the frame 1 is updated (S202). In the state S4, the frame 3 is updated based on the frame 2 (S205). Since the deviation of the frame 1 from the frame 3 is not still large, the (N+1)th loop ends without execution of step S208.

In the (N+2)th loop, the frame 2 is updated in the state S5 illustrated in FIG. 7 (S201), the frame 1 is updated in a state S6 (S202), and the frame 3 is updated based on the frame 2 in the state S7 (S205). Since the deviation of the frame 1 from the frame 3 becomes large, the frame 1 is updated to match the frame 3 in the state S8 (S208).

In the (N+3)th loop, the frame 2 is updated in the state S9 illustrated in FIG. 8 (S201), and the frame 1 is updated in a state S10 (S202). In this example, it is supposed that another object is detected at a position away from the current target, and the frame 2 is set to such another object. In this case, the process transitions from step S204 to step S209, and the frame 3 is updated to match the frame 1 in a state S11 (S209).

In this manner, in the tracking process illustrated in FIG. 5, every time when acquiring the third image (one of a sequence of the third images), the second CPU 21 updates the frame 3 so as to reduce a difference (in position, size, shape, and the like) between the frame 3 and the frame 2 by a predetermined ratio (S205). Furthermore, every time when acquiring the third image (one of a sequence of the third images), the second CPU 21 updates the frame 1 so as to match the frame 3 (in position, size, shape, and the like) in a case in which the difference between the frame 1 and the frame 3 exceeds a threshold value which corresponds to the second threshold value (S208).

The marine vessel 11 is equipped with an automatic tracking mode as one of the maneuvering modes. In the automatic tracking mode, the controller 30 controls the steering actuator 24, the PTT mechanism 27, the throttle opening adjustment unit 26, and the like, by using the positional information of the target that has been received from the output unit 59 so as to be able to automatically track the target. Note that parameters such as an interval from the target at the time of automatic tracking, a shift amount in the left-and-right direction with respect to the travel route of the target, and the like may be set optionally. Note that an object, the position of which does not move, such as a buoy, may be set as a target. In this case, the marine vessel 11 is made to stay at a certain distance from the buoy when the automatic tracking mode is set.

According to the present preferred embodiment, the second CPU 21 tracks the target in the third image by using the KCF algorithm (S202), and use the frame 2 set for an object detected in the process of tracking the target, to correct the frame 1, which indicates the tracking result of the target (S208). Accordingly, the tracking accuracy of objects on a water surface is improved as compared with the method for simply tracking only by using the KCF algorithm.

In addition, the tracking result is output as the positional information of the target so that the tracking result is able to be used to control the marine vessel such as automatic tracking.

Although the frame 3 is used to correct the frame 1 in the preferred embodiments described above, the use of the frame 3 is not necessarily essential. For example, the frame 1 may be updated to be matched with the frame 2 every time when one of a sequence of images is acquired. An operation in this case is substantially the same as the case in which the frame 3 is used for correction of the frame 1 and the predetermined ratio in step S205 is set to 100%.

Note that even in a case in which the frame 3 is used for correction of the frame 1, the frame 3 does not have to be superimposed on the third image. That is, only the frame 1 and the frame 2 may be displayed while being superimposed on the third image.

Note that, in the preferred embodiments described above, the third image is acquired by the third camera 42, which is another imaging unit other than the stereo camera 41. However, without being limited to this configuration, an image acquired by one of the cameras 41a and 41b may be used as the third image. Therefore, the third camera 42 or the third image acquisition unit 53 is not necessarily essential.

Note that the first and second images are respectively acquired from the cameras 41a and 41b in the present preferred embodiment. However, on the contrary, the first and second images may be respectively acquired from the cameras 41b and 41a. In other words, the first image may be acquired from one of the cameras 41b and 41a, and the second image may be acquired by the other one of the cameras 41b and 41a.

Note that the arrangement positions of the stereo camera 41 and the third camera 42 are not limited to the front portion of the hull 13, and may be a side portion or a rear portion of the hull 13. These cameras may be mounted near an upper end of the cabin 29 (for example, an upper end of the front portion). The imaging directions of the cameras are not limited to the front of the hull 13, and may be a side or the rear of the hull 13.

Note that a marine vessel to which the tracking system according to preferred embodiments of the present invention is provided is not limited to a marine vessel including an outboard motor, and may be a marine vessel including another type of the marine propulsion device, such as an inboard/outboard motor (stern drive, inboard motor/outboard drive), an inboard motor, and a water jet drive.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A tracking system for tracking water-surface objects, the tracking system comprising:
    a stereo camera including a first imaging unit and a second imaging unit, the stereo camera being disposed on a hull;
    at least one memory; and
    at least one processor coupled to the at least one memory and configured or programmed to:
        acquire a first image captured by either one of the first imaging unit or the second imaging unit;
        acquire a second image captured by the other one of the first imaging unit or the second imaging unit;
        acquire a third image captured by any one of the first imaging unit, the second imaging unit, or another imaging unit disposed on the hull;
        detect at least one object based on the first image and the second image;
        set one of the detected at least one object as a tracking target in the third image;
        track the tracking target in the third image by using a temporal change in a feature of the tracking target in the third image; and
        use at least one object detected based on the first image and the second image in a process of tracking the tracking target in the third image to correct a tracking result of the tracking target in the third image.

2. The tracking system according to claim 1, wherein the at least one processor is further configured or programmed to:
    acquire positional information of the tracking target based on the tracking result, the positional information including a relative distance of the tracking target from the stereo camera and an azimuth of the tracking target with respect to the stereo camera; and
    output the acquired positional information.

3. The tracking system according to claim 2, wherein the at least one processor is further configured or programmed to:
    in acquiring the positional information, acquire the azimuth of the tracking target based on a position in a left-and-right direction of the tracking target in the third image, and acquire the relative distance based on an image portion corresponding to the tracking target in the first image and an image portion corresponding to the tracking target in the second image.

4. The tracking system according to claim 2, further comprising a navigation controller configured or programmed to control navigation of the hull by using the output positional information.

5. The tracking system according to claim 1, wherein the at least one processor is further configured or programmed to, in correcting the tracking result of the tracking target:
set a first frame in the third image indicating a position of the tracking target as the tracking result, and set a second frame in the third image indicating a position of one of the at least one object detected based on the first image and the second image; and
correct the tracking result by updating a position and a shape of the first frame based on the second frame in the process of tracking the tracking target.

6. The tracking system according to claim 5, wherein the at least one processor is further configured or programmed to, in correcting the tracking result of the tracking target:
set a third frame in the third image based on the second frame; and
correct the tracking result by updating a position and a shape of the third frame based on the second frame and updating the position and the shape of the first frame based on the third frame in the process of tracking the tracking target.

7. The tracking system according to claim 6, wherein the at least one processor is further configured or programmed to, in correcting the tracking result of the tracking target:
every time when acquiring one of a sequence of the third images, update the third frame so as to reduce a difference between the third frame and the second frame by a predetermined ratio, and every time when acquiring one of a sequence of the third images, update the first frame to match the third frame in a case in which a difference between the first frame and the third frame exceeds a threshold value.

8. The tracking system according to claim 5, further comprising a display to display the third image; wherein the at least one processor is further configured or programmed to:
in correcting the tracking result of the tracking target, cause the display to display the third image on which the first frame and the second frame are superimposed.

9. The tracking system according to claim 1, wherein the at least one processor is further configured or programmed to:
track the tracking target by using a Kernelized Correlation Filter algorithm.

10. A tracking method for tracking water-surface objects for use in a marine vessel, the marine vessel including a stereo camera including a first imaging unit and a second imaging unit, the stereo camera being disposed on a hull, the tracking method comprising:
acquiring a first image captured by either one of the first imaging unit or the second imaging unit;
acquiring a second image captured by the other one of the first imaging unit or the second imaging unit;
acquiring a third image captured by any one of the first imaging unit, the second imaging unit, or another imaging unit disposed on the hull;
detecting at least one object based on the first image and the second image;
setting one of the detected at least one object as a tracking target in the third image;
tracking the tracking target in the third image by using a temporal change in a feature of the tracking target in the third image; and
using at least one object detected based on the first image and the second image in a process of tracking the tracking target in the third image to correct a tracking result of the tracking target in the third image.

11. A marine vessel comprising:
a hull; and
a tracking system for tracking water-surface objects, the tracking system including:
a stereo camera including a first imaging unit and a second imaging unit, the stereo camera being disposed on the hull;
at least one memory; and
at least one processor coupled to the at least one memory and configured or programmed to:
acquire a first image captured by either one of the first imaging unit or the second imaging unit;
acquire a second image captured by the other one of the first imaging unit or the second imaging unit;
acquire a third image captured by any one of the first imaging unit, the second imaging unit, or another imaging unit disposed on the hull;
detect at least one object based on the first image and the second image;
set one of the detected at least one object as a tracking target in the third image;
track the tracking target in the third image by using a temporal change in a feature of the tracking target in the third image; and
use at least one object detected based on the first image and the second image in a process of tracking the tracking target in the third image to correct a tracking result of the tracking target in the third image.

12. The tracking system according to claim 1, wherein the third image is captured by the another imaging unit disposed on the hull.

* * * * *